US009460231B2

(12) United States Patent
Thompson et al.

(10) Patent No.: US 9,460,231 B2
(45) Date of Patent: Oct. 4, 2016

(54) SYSTEM OF GENERATING NEW SCHEMA BASED ON SELECTIVE HTML ELEMENTS

(75) Inventors: Simon G Thompson, Woodbridge (GB); Duong T Nguyen, London (GB); Marcus Alfred Thint, Reston, VA (US); Hamid Gharib, Ipswich (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 507 days.

(21) Appl. No.: 13/637,483

(22) PCT Filed: Mar. 28, 2011

(86) PCT No.: PCT/GB2011/000442
§ 371 (c)(1),
(2), (4) Date: Sep. 26, 2012

(87) PCT Pub. No.: WO2011/117594
PCT Pub. Date: Sep. 29, 2011

(65) Prior Publication Data
US 2013/0019163 A1  Jan. 17, 2013

(30) Foreign Application Priority Data

Mar. 26, 2010  (EP) .................... 10250609

(51) Int. Cl.
*G06F 17/30* (2006.01)
*G06F 17/00* (2006.01)
*G06F 17/22* (2006.01)

(52) U.S. Cl.
CPC ......... *G06F 17/30908* (2013.01); *G06F 17/00* (2013.01); *G06F 17/227* (2013.01); *G06F 17/2247* (2013.01); *G06F 17/30* (2013.01)

(58) Field of Classification Search
CPC ...... G06F 17/30; G06F 7/00; G06F 17/2247; G06F 17/272; G06F 17/227; G06K 9/46
USPC ............................................... 715/234; 707/3
See application file for complete search history.

(56) References Cited

U.S. PATENT DOCUMENTS

| 8,185,894 | B1 * | 5/2012 | Watson ................. G06F 9/485 718/1 |
| 8,364,613 | B1 * | 1/2013 | Lin et al. ........................ 706/12 |
| 8,655,803 | B2 * | 2/2014 | Lecerf et al. ................... 706/12 |
| 2002/0021838 | A1 | 2/2002 | Richardson et al. |
| 2005/0027681 | A1 * | 2/2005 | Bernstein et al. ................ 707/1 |

(Continued)

FOREIGN PATENT DOCUMENTS

JP  2008-123062  5/2008

OTHER PUBLICATIONS

Bellahsene et al, "On Evaluating Schema Matching and Mapping", 2011, p. 253-291, 39p. Publisher Springer Science & Business Media B.V (Book).*

(Continued)

*Primary Examiner* — Cesar Paula
*Assistant Examiner* — Jian Huang
(74) *Attorney, Agent, or Firm* — Nixon & Vanderhye P.C.

(57) ABSTRACT

The present invention provides a system which is able to detect similar web page elements which are described in mark-up language, such that the content of those elements can be captured. Text content may then be sent to a text classifier for further analysis.

9 Claims, 5 Drawing Sheets

(56) References Cited

U.S. PATENT DOCUMENTS

| | | | |
|---|---|---|---|
| 2005/0154686 A1 | 7/2005 | Corston et al. | |
| 2006/0026114 A1 | 2/2006 | Gregoire et al. | |
| 2006/0206502 A1* | 9/2006 | Gaurav et al. | 707/100 |
| 2007/0055655 A1* | 3/2007 | Bernstein et al. | 707/3 |
| 2008/0050712 A1 | 2/2008 | Madani et al. | |
| 2008/0183700 A1 | 7/2008 | Gabriel et al. | |
| 2008/0256065 A1 | 10/2008 | Baxter | |
| 2008/0281764 A1 | 11/2008 | Baxter | |
| 2009/0055359 A1 | 2/2009 | Gross | |
| 2009/0092241 A1 | 4/2009 | Minert et al. | |
| 2009/0125693 A1* | 5/2009 | Idicula et al. | 711/170 |
| 2009/0157668 A1 | 6/2009 | Newton et al. | |

OTHER PUBLICATIONS

International Search Report for PCT/GB2011/000442, mailed Jun. 22, 2011.

Nayak, R. et al., "Report on the XML mining track's clustering task at INEX 2009", INEX 2009 Workshop Pre-Proceedings, (Dec. 6, 2009), pp. 343-348.

Kutty, S. et al., "Clustering XML Documents Using Multi-Feature Model", INEX 2009 Workshop Pre-Proceedings, (Dec. 6, 2009), pp. 379-380.

Kutty, S. et al., "Combining the Structure and Content of XML Documents for Clustering Using Frequent Subtrees", INEX 2008 Workshop Pre-Proceedings, (Dec. 15, 2008), pp. 391-401.

Pascal Soucy and Guy W. Mineau, "Beyond TFIDF Weighting for Text Categorization in the Vector Space Model", Coveo, Quebec, Canada and Universite Laval, Quebec, Canada, date unknown (6 pgs.)

Nayak, R. et al., "Report on the XML Mining Track's Clustering Task at INEX", Faculty of Science and Technology, Queensland University of Technology, Brisbane, Australia, 2009 (6 pgs.)

Kutty, S. et al., "Clustering XML documents using Multi-feature Model", Faculty of Science and Technology, Queensland University of Technology, Brisbane, Australia, 2009 (2 pgs.)

Kutty, S. et al., "Combining the structure and content of XML documents for Clustering using frequent subtrees", Faculty of Science and Technology, Queensland University of Technology, Brisbane, Australia, 2008 (12 pgs.)

* cited by examiner

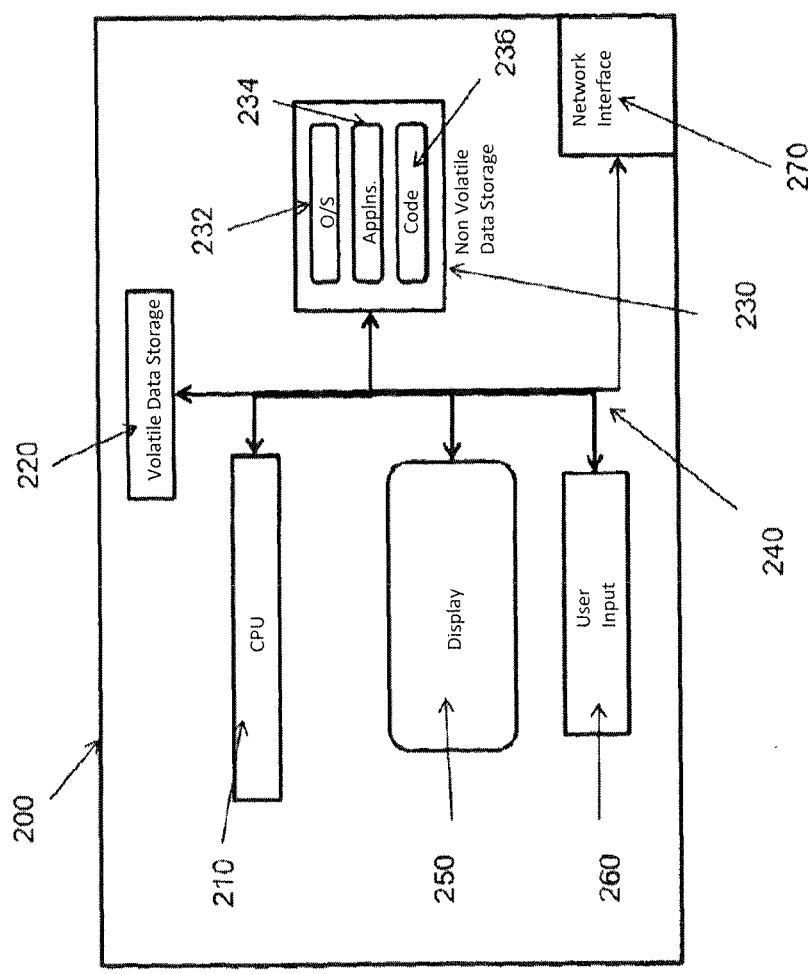

SYSTEM OF GENERATING NEW SCHEMA BASED ON SELECTIVE HTML ELEMENTS

This application is the U.S. national phase of International Application No. PCT/GB2011/000442, filed 28 Mar. 2011, which designated the U.S. and claims priority to EP Application No. 10250609.4, filed 26 Mar. 2010, the entire contents of each of which are hereby incorporated by reference.

BACKGROUND AND SUMMARY

The present invention relates to a system for analysing textual data and in particular to a system for analysing online content to identify textual data of interest.

Social networking sites and other Web 2.0 services allow users to create comments or content regarding the goods and services that they have used and for other users to then add further comments. For example, groups on Facebook or Twitter trends can quickly be established which may make unfavourable comments regarding a business's activities or products, leading to subsequent brand damage for the business concerned. Given the large number of social networking sites, blogs, message boards, etc. it is not a practical proposition for a business or enterprise to monitor all of the comments, messages, user generated content, etc., that is generated in order to be able to respond to untrue or unfavourable information.

A known system for monitoring social networks is provided by Radian6 (see http://www.radian6.com). The system extracts relevant posts from social networks, and other sources of user comments, which can be categorised, prioritised and then assigned to an agent for subsequent processing. The classification of a post as being relevant is based solely on a set of keywords.

According to a first aspect of the present invention, there is provided a method of automatically generating a mark-up language schema, the method comprising the steps of: a) receiving a plurality of training samples, the or each training sample identifying one or more mark-up language elements stored within an online data resource; b) for each of the plurality of received training samples, automatically generating a candidate mark-up language schema; c) for each of the plurality of candidate mark-up language schema, comparing that candidate schema with the remainder of the candidate schemas to determine how many of the schema match and selecting a candidate mark-up language schema if the proportion of matching candidate schema exceeds a predetermined threshold; d) if none of the plurality of candidate mark-up language schema matches a sufficient number of the other schema, generating a further mark-up language schema and executing a further instance of step c); and e) reiterating step d) until one of the candidate schemas matches with a sufficient number of the other schema.

According to a second aspect of the present invention, there is provided a method of analysing mark-up language text, the method comprising the steps of: i) applying a mark-up language schema to an online data resource, the mark-up language schema comprising a plurality of mark-up language elements; ii) identifying one or more data elements comprised within the online data resource, the or each data elements being associated with a particular mark-up language element; and iii) extracting those data elements identified in step ii), wherein the mark-up language schema is generated using a method as described above.

Further aspects of the present invention provide a digital data carrier comprising computer executable code for performing a method according to one of the methods described above and an apparatus, comprising one or more processors and one or more memory means, the apparatus, in use, being configured to perform a method according to one of the methods described above

BRIEF DESCRIPTION OF THE DRAWINGS

Embodiments of the present invention will now be described, by way of example only, with reference to the accompanying drawings in which:

FIG. 5 shows a schematic depiction of a general purpose computing apparatus suitable for executing a method according to the present invention.

DETAILED DESCRIPTION OF PRESENT EXAMPLE EMBODIMENTS

Figure 1:
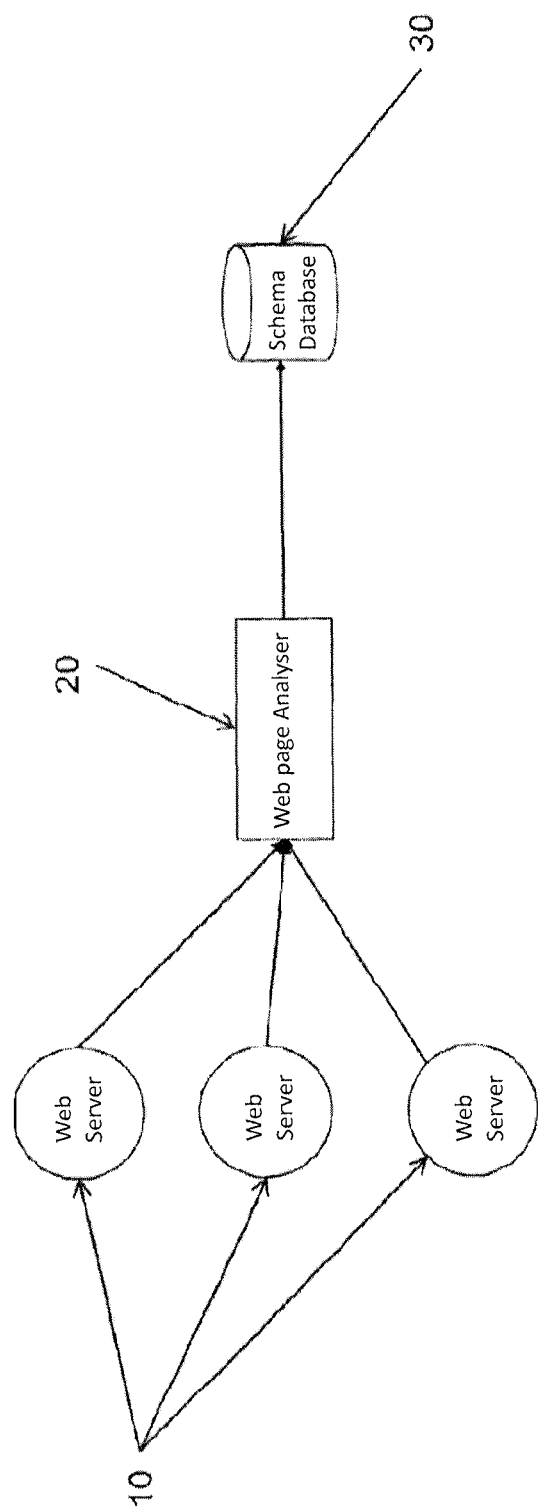
FIG. 1 shows a schematic depiction of a system that is used in a method according to the present invention.

FIG. 1 shows a schematic depiction of a system that is used in a method according to the present invention which comprises a plurality of web servers 10, a web page analyser 20 and a contract extract schema database 30. The plurality of web servers each comprise content that may be of interest to a party, such as an individual, business or other enterprise. The content from one or more web servers 10 may be analysed by web page analyser 20 and the result of this analysis is one or more content extraction schema (CES), which may be stored within CES database 30.

Figure 2:
FIG. 2 shows an example of a web page from a news site.

Typically, only a subset of the contents of a web site will be of interest to a particular user and this will be referred to as 'relevant content' in the following discussion and detailed description of the present invention. Each user can select their choice of relevant content for each web site or type of web site. Thereafter, only relevant content which matches these selections will be extracted from such web sites. FIG. 2 shows an example of a web page from a news site; in this case the user may only be interested in the main news story 60 shown on that page and not interested in the subject list 64 in the left-hand column or the list of other news stories 62 in the right column.

Each web site normally consists of a set of web pages. Each page is internally encoded in a mark-up language, such that the page consists of a set of mark-up elements. An example of a mark-up language is HTML (Hyper Text Mark-up Language). Pages encoded in HTML consist of a set of HTML elements. The elements provide both the contents of the page as well as its 'look and feel'. The elements are normally embedded within each other, forming one or more element hierarchies. The web page analyser 20 identifies the set of mark-up elements whose contents are collectively the same as the relevant content. Whilst it is relatively straight forward to find an HTML element in the higher levels of an element hierarchy whose contents includes the relevant content, the content of such an element content may also comprise a considerable amount of contents which has not been defined as being relevant. Avoiding the extraction of irrelevant text is more complex and is one of the key functions of the web page analyser.

In order for the web page analyser to be able to determine which HTML elements within a web page correspond to selected or defined relevant content it is necessary to undergo a training process. During this training process a number of samples of the relevant content of interest, referred to as training texts, are supplied to the web page analyser, for example by entering the URLs which refer to the web pages containing the training texts as well as the text of the relevant content. Thus, the web page analyser is able to access the web page comprising the training text and by searching for the training text in that web page is able to identify the HTML elements that are associated with the training text.

For each training text, the web page analyser searches the content of the relevant web page to determine the set of HTML elements whose contents match, as closely as possible, the supplied training text. Each element in the set of HTML elements should be uniquely identifiable within the HTML-encoded page. However, it is possible for an HTML element to be used more than once within the page. In this case, the web page analyser will add two types of identification to the HTML element to make it uniquely identifiable. Firstly, the web page analyser can identify the sequence of ancestors of the HTML element, that is, its parent element, grand-parent element, and so on. Thus, the HTML element of interest can be uniquely identified within the hierarchy of HTML elements. Secondly, the web page analyser can determine the instance number of the element (for example the third or fifth instance) among the set of instances of that element. This instance number can then also be used to identify the HTML element that is of interest.

The resulting set of elements will be referred to as a Content Extraction Schema (CES). An example of such a CES is given below:

```
<Schema name="Schema1" version="1">
    <PropertyLists role="NewsItemPropertiesContainer" acceptanceThreshold="60%" firstProperty="Title">
        <Property role="TitleContainer" sourceElem="<table>" sourceElemInstanceNum="3">
            <AncestorList>
                <Ancestor> <body> </Ancestor>
                <Ancestor> <html> </Ancestor>
            </AncestorList>
        </Property>
    </PropertyLists>
</Schema>
```

As the web page analyser will receive a number of training samples, for example three, it will generate one CES one for each of the training samples received. The user also specifies an acceptance threshold for an occurrence frequency (for example 60%) that is used to determine which of the CESs should be selected for future use; a CES having an occurrence frequency that is equal to or greater than the acceptance threshold will be selected as the final CES and stored within the CES database for future use. A stored CES may be associated with an individual user, or a group of users, such that content identified by the CES can be returned to those user(s) that have expressed an interest in that content.

Initially, the generated CESs will be compared and if they are identical with each other then the occurrence frequency is 100% and thus one of the of the CESs will be selected for future use, stored in the CES database and then the training process is terminated. For the case where three CESs are generated then it will be seen that one potential scenario where two of the CESs match each other. In such a scenario, the two matching CESs can be regarded as being a single CES having an occurrence frequency of 67%. Given an acceptance threshold of 60% then one of these CESs may be selected for use. Again, the selected CES is stored in the CES database and the training process is terminated. It can also be seen that the other potential scenario is that all of the generated CESs are different. In this case, the occurrence frequency for each candidate CES is 33%.

As this is less than the required 60% acceptance threshold, the training process should be then repeated to generate a fourth CES which will then be compared with the existing candidate CESs. If a match is found the occurrence frequency of the matching candidate CES is increased accordingly. This process can then be repeated until one of the candidate CDESs has an occurrence threshold which reaches the acceptance threshold value. It can be seen that if two further CESs are generated which both match with one of the initial CES candidates then there will be three matching CESs within a total pool of five CESs, giving an occurrence threshold of 60%. That candidate CES can then be selected, stored in the CES database and the training process terminated. If, on the other hand, there is no match, the further CES will be become a new candidate CES itself with its own occurrence-frequency, which will be 1 divided by the total number of CESs at that point in time. The creation of further CESs and their matching with the candidate CESs will continue until the acceptance threshold of the occurrence frequency is reached.

Two CESs may match even if they are not identical provided that they have common patterns. For example, consider the following three elements from three CESs:

```
<div id="post_message_1642712">
<div id="post_message_1642531">
<div id="post_message_1642573">
```

Here, it can be seen that the common pattern is:
<div id="post_message_">
and accordingly the three CESs match each other. The common pattern can be stored as:

```
<Schema name="Schema1" version="1">
    <PropertyLists role="NewsItemPropertiesContainer" acceptanceThreshold="60%" firstProperty="Title">
        <Property role="TitleContainer" sourceElem="<div id="post_message_">" sourceElemInstanceNum="1">
            <AncestorList>
                <Ancestor><table border=0 width=862></Ancestor>
                <Ancestor><html></Ancestor>
            </AncestorList>
        </Property>
    </PropertyLists>
</Schema>
```

This CES can then be selected for future use and the method terminated.

It will be understood that although the preceding discussion has been in relation to HTML content, HTML is merely an example of a mark-up language. The present invention is equally applicable to other mark-up languages, such as, for example XML.

Figure 3:
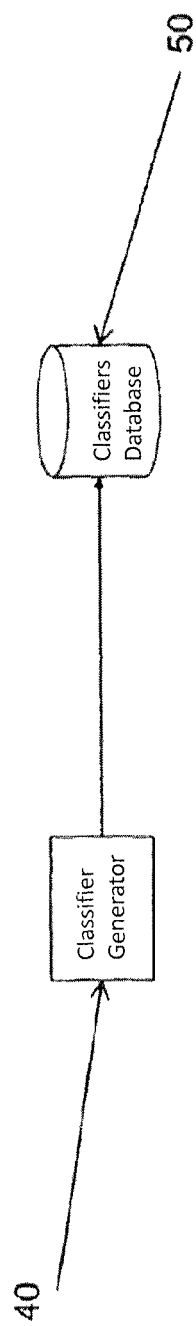
FIG. 3 shows a schematic depiction of a classifier generator.

FIG. 3 shows a schematic depiction of a classifier generator 40 which receives sets of keywords and sample text passages that define and classify particular text categories. These keywords and text passages are processed by the classifier generator 40 and the results stored within a classifiers database 50. The keywords and sample text passages may be provided by one or more domain experts.

A classifier may categorize inputs to multiple output classes, but such operation of classifying inputs $I_A$, $I_B$, $I_C$ ... to outputs $O_1$, $O_2$, $O_3$.constitute solving one problem, using model Cm1 learned by the classifier. A different problem of classifying inputs $I_\alpha$, $I_\beta$, $I_\gamma$ to outputs $O_I$, $O_{II}$, $O_{III}$ may require model Cm2. Consequently, the classifier generator 40 supports the training process of the classifier (further described below) to generate multiple classifier models Cm1 ... CmN, and these N models are stored in classifiers database 50. The content of these models specify values for parameters related to the support vector machine (see below). Hence, this system design provides multi organization support, as the same classifier system may be deployed to solve different problems.

Figure 4:
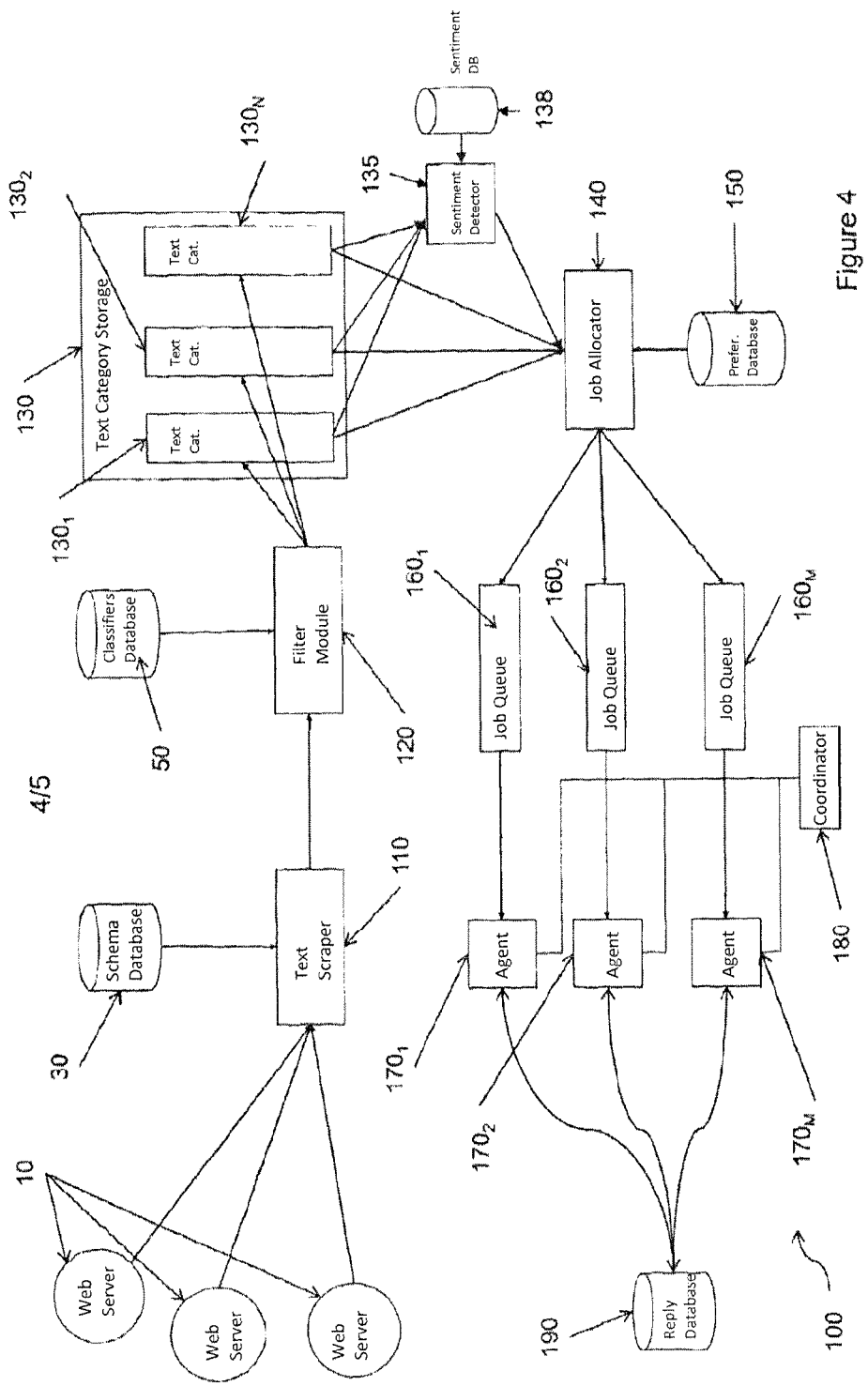
FIG. 4 shows a schematic depiction of a text classification system.

FIG. 4 shows a schematic depiction of a text classification system 100 which uses the contract extract schema derived from a method according to the present invention. The system 100 comprises CES database 30, classifier database 50, text scraper 110, text classifier and filter module 120, text category storage means 130, which comprises text categories $130_1$, $130_2$, ..., $130_N$, sentiment detector 135, sentiment database 138, job allocator 140, allocation preference database 150, allocated job queues $160_1$, $160_2$, ..., $160_M$, agents $170_1$, $170_2$, ..., $170_N$, agent co-ordinator 180 and reply database 190. The text scraper 110 is configured to receive data from web servers 10 and the agents $170_1$, $170_2$, ..., $170_N$ are configured to return appropriate replies to the web servers 10. The web servers 10 do not from a part of the system 100. It should be understood that the term web server should be construed widely such that it comprises other forms of content that accessed via communications networks, such as intranets or the internet, such as social networking sites, messaging sites, blogs, forums, sites for hosting multimedia content such as video, audio, photographs, user generated content, etc.

The text scraper is configured to extract the textual contents from a page (or pages) of a web site. The specific parts of those web pages are identified by an appropriate CES that can be accessed by the text scraper from the CES database 30. In operation, a user will send the contents of a web page to the text scraper (for example by sending the URL for the page to the text scraper [which may be accessed directly or via some form of gateway or interface]) along with a selected CES. The text scraper uses the CES to detect the relevant content held on the page and extracts the relevant content.

The content extracted by the text scraper 110 is then sent to the text classifier and filter module 120. The text classifier and filter module is connected to the classifiers database 50 such that the text classifier and filter module can access the various text category classifications which are held within the classifiers database. The function of the text classifier and filter module is to classify one or more items of relevant content supplied by the text scraper such that each of the items of relevant content can be placed into one or more of the pre-defined text categories $130_1$, $130_2$, ..., $130_N$ which are stored within the text category storage means 130.

The text classifier and filter module comprises a trainable text classifier which can categorise the text supplied by the text scraper into one or more categories. It works based on support vector machine (SVM) algorithm, forming hyperplanes to separate keyword features into designated class labels during supervised training, to minimize errors in the training sample and maximize separation margins between classes. It is known to use SVM algorithms in text classification (see, for example, T. Joachims, "*Text categorization with support vector machines: learning with many relevant features,*" *Machine Learning: ECML-98*, vol 1389, Heidelberg).

It will be understood by those skilled in the art that text classification methods other than the support vector machine algorithm may be used. Suitable alternate classification methods that are known in the prior art include a naïve Bayes algorithm or K-nearest neighbour algorithm.

Typical text classification takes place in the context of formal written texts, such as newspaper articles, academic papers, product literature, business reports, etc., which are almost always written in a style that is grammatically correct, properly punctuated and contain limited or no slang expressions. In such cases, the input features to the text classifier are human specified keywords and/or the individual words from the text (excluding common 'stopwords' well known in the prior art), along with their frequency of occurrence within the text.

It will be understood readily by those skilled in the art that the text classification problem with regard to more informal material is a more difficult problem, as it entails classification of text extracted from social media content, which is much more likely to include grammatical errors, missing punctuation, slang expressions, and emotional utterances (e.g. Aaargh!). In addition to the standard input features employed by prior art, the feature selection process for the classifier:

(i) excludes common salutations (e.g. dear, hello, hi, hey ... ) and closings (e.g. thanks, regards, bye ... ) from a pre-specified list;
(ii) excludes miscellaneous chat phrases (e.g. hope this helps, good luck);
(iii) uses bi-grams and tri-grams (2 and 3 word phrases); and
(iv) noun-phrases and verb-phrases from complete sentences.

These noun and verb phrases can be identified using known parser tools such as nlp.stanford.edu/downloads/lex-parser.shtml or nlp.cs.berkeley.edu/Main.html#parsing.

Trainable classifiers develop an internal model of salient features for each of the output categories during the training process. These features are abstract numerical or symbolic representations that are not easily comprehended or decoded by a human user. As a consequence of this, it is not possible or advisable for manual alteration of the classifier's internal feature model to adjust its performance and behaviour, without adding to the cost significantly. However, it is often desirable to inject human knowledge and control into the behaviour of the classifier. Nevertheless, it is insufficient to rely only on human specified features or rules, as they are often incomplete, error prone, or simply inadequate, especially in the realm of natural language text processing. It should be noted that if it were possible for a human operator to describe a perfect model or set of rules, then there would be no need for such an automatic classifier.

Thus, operator-specified key phrases can be merged into the classifier's normal training process, to allow for the development of learned features, for example term frequencies, specificity, and exceptions. It is also possible to control the impact of operator-specified features by the inclusion of high-level descriptors (such as, for example, "none", "low", "medium", "mediumHigh", "high", or "total"), which can be used to change the ratio of training samples to human specified key phrases.

This control is achieved by a user or system designer simply setting a training parameter to one of the aforementioned labels such as "medium". The classifier generator 40 translates the human-friendly descriptor to a numerical "blending factor" that is proportional to the average number of training samples per category and pre determined via experimental studies. In one preferred embodiment, requested "low" influence presents (to the classifier) the human-specified key phrases an equal number of occurrences as the sample text passages; a blend factor multiplier of 1. A "medium" influence uses a blend factor multiplier of 2, "mediumHigh" uses 3, and "high" uses 4. In the extreme cases of "none" and "total", only the sample text passages or human specified key phrases are presented to the classifier respectively. Since the underlying mathematical model of the SVM engine operates on a statistical basis, adjusting the frequency of terms it sees during training adapts the bias factors in the model towards a desired behaviour.

The text classifier 120 further comprises a text filter module, which is not found in a conventional text classifier system. Conventionally, a text classifier will attempt to categorize any given input text to one of a number of pre-defined categories, even if the input text is not relevant to any of the categories. It can be seen that such an approach is likely to lead to undesirable results in some real-world applications. The text filter module is applied to the relevant content before the content is presented to the text classifier. The text filter module scans the relevant content to determine whether it has a reasonable similarity, to satisfy some matching criteria, to any one of the text categories. In one embodiment of the invention, the degree of similarity is based on the term vector similarity between the relevant content and each of the text categories, and the matching criteria is a threshold value which is determined empirically. It should be noted that in lieu of a singular threshold value, the decision border could be represented by the well-known prior art concept of fuzzy set; similarity value is mapped to a membership value in the fuzzy set, where the matching criteria comprises an interval of values (e.g. a set of values close to a target threshold on either side).

In the interest of computing efficiency, the term vector similarity computed is a more compact and simplified variation of a known vector space model (see P. Soucy & G. W. Mineau. "*Beyond TFIDF weighting for text categorization in the vector space model*, IJCAI 2005, pp 1130-1135). Input term vectors comprise the key phrases in the input text passages, which are compared to each of the human-specified reference or category term vectors. Human-specified terms may also have associated weights to indicate their importance to a specific category. Hence, a similarity metric is computed, based on the weighted percentage of matches between the input and reference term vectors for each category.

If the maximum value of the computed similarity metric does not satisfy a matching criteria (pre-determined by experiment and human inspection) then the input text passage is dissimilar to all categories of interest and the text passage is not presented to the classifier and is categorised as 'Other' or 'Rejected'. Alternatively, if the relevant content has a similarity metric value which satisfies matching criteria then the relevant content will be presented to the text classifier for processing. The combined text filter classifier means effectively provides an additional 'none-of-the-above' category which is typically difficult to achieve via a classifier training process alone, as it is simple to provide samples of an object that belongs to a category, but more difficult to define, by examples, what does not belong to that category, as the 'negative' case can require a huge amount of training data.

After the relevant content has been assigned to one or more categories then the relevant content may be analysed further in order to determine the sentiment of the relevant content. Such information may be of use in determining overall user satisfaction with particular services. Furthermore, if a relevant content can be determined as being particularly angry in tone or language then it may be appropriate for the relevant content to be flagged as being of high priority such that it may be dealt with more promptly or by a more experienced agent.

Automated sentiment analysis is currently regarded as a research topic, due to complexities associated with multiple negations and sarcastic comments that are commonly present in natural language expressions. Hence, the sentiment detector 135 focuses on those cases based on pre-determined pattern-based rules. Pattern based rules analyse a sentence or phrase for pre-specified conditions such as "curse words mentioned near company product", or "expression of anguish anywhere" (e.g. I'm fed up, I've had it with . . . ). Curse words, company products and other phrases of interest are pre-compiled and stored together with pattern-based rules in sentiment database 138. The location and proximity of words and/or phrases of interest can be specified and detected using a known method of "regular expressions", which is a computational syntax to describe the ordering pattern of characters.

The sentiment detector module may be viewed as a supplemental enhancement to the system, as when such sentiments are detected then it is possible to raise the priority of the task in question. However, in the event that the sentiment detector misses angry and/or dismissive content then no errors are introduced into the system or other problems cause, beyond the failure to raise the priority of the respective task(s).

The job allocator 140 takes content which has been classified by the text classifier and filter module and then allocates that content to one of the allocated job queues $160_1, 160_2, \ldots, 160_M$, with each of the allocated job queues being uniquely associated with an agent terminal $170_1$, $170_2, \ldots, 170_N$. The allocation of classified content as a job is undertaken on the basis of the contents of the allocation preference database 150. The allocation preference database will indicate which of the agents are logged into the system (and thus are able to receive jobs) and the preference, experience and skills for each agent in relation to each of the text categories 130. Thus, an agent will not be allocated a job that they are not able to process. The activity of an agent and the number of jobs presently in the job queue associated with an agent may also be used when allocating jobs so that the workload is spread as evenly as is possible across those agents with the appropriate skills and experience. When a job is allocated to a job queue, a time limit for the job to be processed within may be set and if the agent does not process the job within that time limit then a reminder may be sent to the agent and to the agent co-ordinator.

The main role of the agent is process jobs received from the job allocator, for example by responding to an enquiry, a question or a posting on an on-line forum. As described above, the classification of the relevant content allows the jobs to be allocated to an agent which is able to deal with the jobs. The agent can use their agent terminal 170 to login to the web server 10 where the relevant content originated from and to post an appropriate response. If required, an agent may send a proposed response from their agent terminal to a co-ordinator terminal 180 such that a co-ordinator can confirm that the details and/or the tone of the response are appropriate to the original issue. Rather than requiring an agent to log in separately to a number of different web servers (or other online resources), the agent terminal 170 may hold a profile for the agent which comprises usernames and associated passwords for a number of different web server that are frequently used. This profile held by the agent terminal 170 allows the agent to enter the response into the agent terminal and for all communication with the web server to be controlled by the agent profile executed by the agent terminal, avoiding the need for the agent to log into each of the web servers as and when it is needed. The co-ordinator is responsible for the management of a number of agents, for example that each of the agents is dealing with an expected number of jobs, monitoring the distribution of jobs across the range of categories and re-training and re-skilling the group of agents as may be appropriate. As noted above, agents may seek the approval of a co-ordinator for a particular response. A co-ordinator may become responsible for dealing with a job if there is an escalation that follows an agents response. Those jobs that are determined to be of high priority (see above) may be sent direct to a co-ordinator for resolution.

The system shown described above with reference to FIG. 4 is capable of being used across multiple organisations, or multiple different units within a single enterprise. That is, the same classifier package can be used for different problems by different organizations, once appropriate classifiers have been provided and stored within the classifier database.

It should be understood that although the text classification system described above with reference to FIG. 4 is interdependent with the method according to the present invention, the text classification system does not form a part of the present invention.

A person skilled in the art would recognise that the present invention comprises a number of different processes which can be implemented in software, which can be executed on a general purpose computing apparatus, such as a personal computer or a server computer which can be accessed by a client device or terminal. FIG. 4 shows a schematic depiction of such an apparatus 200, which comprises a central processing unit 210, volatile data storage means 220 and non volatile data storage means 230, which are interconnected by data bus 240. The apparatus further comprises display means 250, user input means 260 and network interface 270.

The apparatus may comprise integrated display means and user input means, for example a touch screen, for they may be separate, for example a conventional display screen and a keyboard and/or mouse. The non volatile data storage means may comprise one or more hard disc drives; in addition there may be provided removable non volatile data storage means, such as removable hard disc drives or optical media (for example re-writable or recordable DVDs). The network interface may be a local area network adaptor, with the LAN being connected to other LANs and wide area networks (WANs) to enable the apparatus to communicate with and exchange data with other computers. Alternatively, the network interface may be a DSL modem, or similar, that provides a connection to a WAN, such as the internet or an intranet, which enables communications with further networks.

The non volatile data storage means 230 comprises an operating system 232 and one or more application programmes 234. The operating system comprises the software that the computing apparatus requires to operate, communicate with other computers, receive input from users, display outputs and results to users, etc. Application programs 234 can be executed by the apparatus in order to provide additional functionality. Non volatile data storage means 230 further comprises computer code 236 which can be executed in order to perform a method according to the present invention, for example such as the one described above. It will be understood that the computer code 236 may comprise a single integrated application, or a number of different modules that are accessed separately to execute a method according to the present invention. Each module may perform the functionality of one or more of the processes which comprise the present invention.

A system according to the present invention may be implemented as a standalone platform which is able to receive data and/or content from a range of different online resources and web servers. Alternatively, the computer code which can be executed in order to perform a method according to the present invention may be stored on and executed by the apparatus that is used to host a social networking site, online forum, user generated content service, blogging site, messaging service, user service site etc. It will be understood by a person skilled in the art that a method according to the present invention is of significant utility across a range of applications and that the present invention is not to be limited to the uses discussed above.

In summary, the present invention provides a system which is able to detect similar web page elements which are described in mark-up language, such that the content of those elements can be captured. Text content may then be sent to a text classifier for further analysis.

It will be understood that the exact structure of the general purpose computing apparatus is not important as long as it is capable of executing the computer code which performs a method according to the present invention. Such computer code may be deployed to such a general purpose computing apparatus via download, for example via the internet, or on some physical media, for example, DVD, CD-ROM, USB memory stick, etc.

What is claimed is:

1. A method of automatically generating a mark-up language schema, the method comprising the steps of:
   a) receiving a plurality of training samples, the or each training sample identifying one or more mark-up language elements stored within an online data resource;
   b) for each of the plurality of received training samples, automatically generating a candidate mark-up language schema;
   c) for each of the plurality of candidate mark-up language schema, comparing that candidate schema with the remainder of the candidate schemas to determine how many of the schema match and selecting a candidate mark-up language schema if the proportion of matching candidate schema exceeds a predetermined threshold;
   d) if none of the plurality of candidate mark-up language schema matches a sufficient number of the other schema, generating a further mark-up language schema and executing a further instance of step c); and
   e) reiterating step d) until one of the candidate schemas matches with a sufficient number of the other schema.

2. A method as claimed in claim 1, wherein the or each training sample comprises a uniform resource locator.

3. A method as claimed in claim 1, wherein the or each training sample further comprises a text sequence.

4. A method of analysing mark-up language text, the method comprising the steps of:
   i) applying a mark-up language schema to an online data resource, the mark-up language schema comprising a plurality of mark-up language elements;

ii) identifying one or more data elements comprised within the online data resource, the or each data elements being associated with a particular mark-up language element; and
iii) extracting those data elements identified in step ii), wherein the mark-up language schema is generated using a method in accordance with claim 1.

5. A non-transitory computer readable story medium storing computer executable code for performing a method according to claim 1.

6. An apparatus for generating a mark-up language schema, the apparatus comprising:
  a processing system including one or more processors and one or more storage memories, the processing system being configured to perform at least the steps of:
   a) receiving a plurality of training samples, the or each training sample identifying one or more mark-up language elements stored within an online data resource;
   b) for each of the plurality of received training samples, automatically generating a candidate mark-up language schema;
   c) for each of the plurality of candidate mark-up language schema, comparing that candidate schema with the remainder of the candidate schemas to determine how many of the schema match and selecting a candidate mark-up language schema if the proportion of matching candidate schema exceeds a predetermined threshold;
   d) if none of the plurality of candidate mark-up language schema matches a sufficient number of the other schema, generating a further mark-up language schema and executing a further instance of step c);
   e) reiterating step d) until one of the candidate schemas matches with a sufficient number of the other schema.

7. An apparatus for analysing mark-up language text, the apparatus comprising:
  a processing system including one or more processors and one or more storage memories, the processing system being configured to perform at least the steps of:
   a) receiving a plurality of training samples, the or each training sample identifying one or more mark-up language elements stored within an online data resource;
   b) for each of the plurality of received training samples, automatically generating a candidate mark-up language schema;
   c) for each of the plurality of candidate mark-up language schema, comparing that candidate schema with the remainder of the candidate schemas to determine how many of the schema match and selecting a candidate mark-up language schema if the proportion of matching candidate schema exceeds a predetermined threshold;
   d) if none of the plurality of candidate mark-up language schema matches a sufficient number of the other schema, generating a further mark-up language schema and executing a further instance of step c); and
   e) reiterating step d) until one of the candidate schemas matches with a sufficient number of the other schema;
   f) applying a mark-up language schema to an online data resource, the mark-up language schema comprising a plurality of mark-up language elements;
   g) identifying one or more data elements comprised within the online data resource, the or each data elements being associated with a particular mark-up language element; and
   h) extracting those data elements identified in step g); wherein the mark-up language schema is generated using steps a)-e).

8. A apparatus as claimed in claim 6, wherein the or each training sample comprises a uniform resource locator.

9. A apparatus as claimed in claim 6, wherein the or each training sample further comprises a text sequence.

* * * * *